United States Patent [19]

DeLeary

[11] Patent Number: 4,582,287
[45] Date of Patent: Apr. 15, 1986

[54] STAND, PARTICULARLY FOR AN UMBRELLA TABLE

[76] Inventor: Robert H. DeLeary, 11216 Grenada, Sterling Heights, Mich. 48077

[21] Appl. No.: 576,964

[22] Filed: Feb. 3, 1984

[51] Int. Cl.⁴ .............................................. F16M 13/00
[52] U.S. Cl. .................................... 248/519; 248/535; 248/539
[58] Field of Search ............... 248/519, 558, 521, 530, 248/535, 539

[56] References Cited

U.S. PATENT DOCUMENTS

| | | | |
|---|---|---|---|
| 2,398,748 | 4/1946 | Lange | 248/539 |
| 3,358,952 | 12/1967 | Burns | 248/539 |
| 3,493,203 | 2/1970 | Gualano | 248/539 |
| 3,648,957 | 3/1972 | Bencriscutto | 248/521 |
| 3,943,524 | 3/1976 | Sample | 248/539 |
| 3,955,786 | 5/1976 | Duddy | 248/539 |

Primary Examiner—J. Franklin Foss
Assistant Examiner—Robert A. Olson
Attorney, Agent, or Firm—Remy J. VanOphem

[57] ABSTRACT

A stand for removably interconnecting an intermediate portion of a horizontally disposed elongated member, such as a board of a patio deck, with the lower end of a vertically disposed elongated member, such as the umbrella post of an umbrella table. The stand includes a main body having first and second spaced apart flanges for removably interconnecting the main body with the intermediate portion of the horizontally disposed elongated member. The stand also includes a socket formed in the main body, the socket opening in a direction opposite the direction in which the first and second flanges extend. The socket accepts the lower end of the vertically disposed elongated member. In the preferred embodiment, the main body consists of a U-shaped stamping having a base and two flanges extending therefrom as well as a right circular cylindrical tube welded to the base portion of the U-shaped stamping.

4 Claims, 4 Drawing Figures

STAND, PARTICULARLY FOR AN UMBRELLA TABLE

BACKGROUND OF THE INVENTION

The present invention is directed to stands for removably interconnecting an intermediate portion of a horizontally disposed elongated member with the lower end of a vertically disposed elongated member, and more particularly, to providing a stand for removably and movably interconnecting the lower end of an umbrella post of an umbrella table with an intermediate portion of a board of a patio deck.

Umbrella tables are popular as backyard furniture. Typically, the umbrella table consists of a table having a pedestal or multiple legs supporting a round flat table top. A large collapsible umbrella is mounted to a elongated umbrella post having a first end interconnected with the umbrella, and a second end extending downwardly through an axially located aperture in the table top to a location adjacent the ground.

Since umbrella tables have a very high center of gravity, means must be provided to prevent the umbrella table from being displaced or blown over by gusts of wind. Therefore, a large conically shaped base is usually interconnected with a second end of the umbrella post to provide stability. The conically shaped base is filled with sand, or other material, so as to inhibit any sliding or toppling movement of the umbrella table.

However, the extreme weight of the conically shaped base makes it difficult to move the table when it is desired to relocate the table or disassemble the table. Furthermore, the conically shaped base takes up a substantial amount of storage room when not being used.

What is needed, therefore, is a lightweight, compact, inexpensive, and reliable stand for supporting the lower end of an umbrella post of an umbrella table.

SUMMARY OF THE PRESENT INVENTION

The present invention provides a compact, lightweight, inexpensive, and reliable stand for interconnecting the lower end of a vertically disposed elongated member with an intermediate portion of a horizontally disposed elongated member. The present invention is particularly useful for interconnecting the lower end of an umbrella post of an umbrella table with a board of a patio deck.

The stand of the present invention includes a main body, a first flange extending in the first predetermined direction from the main body, and a second flange spaced a predetermined distance away from the first flange and extending in the first direction. A socket is formed in the main body and opens in a second predetermined direction opposite the first predetermined direction. The stand may therefore be movably interconnected with an intermediate portion of the horizontally disposed elongated member by disposing the main body adjacent to the intermediate portion such that the first and second flanges cooperate with the main body to partially surround the intermediate portion of the horizontally disposed elongated member. The lower end of the vertically disposed elongated member may be removably inserted into the socket so as to removably interconnect the lower end of the vertically disposed elongated member with the intermediate portion of the horizontally disposed elongated member.

The stand may be formed of a single unitary member. Alternatively, it may be formed of two members fixedly interconnected with each other. In the preferred embodiment, the first member is a U-shaped stamping having a flat base portion, the first and second flanges being formed integrally therewith and extending normally from the base portion in the first predetermined direction. The second member is preferably a right circular cylindrical tube fixedly interconnected with the base portion of the U-shaped stamping and extending in a second predetermined direction therefrom.

The stand of the present invention is particularly useful for interconnecting the lower end of an umbrella post of an umbrella table with a board of a patio deck. The stand may be provided with a removable adapter removably insertable in the socket to allow selective removable interconnection of the stand with two alternate umbrella posts of different cross-sectional dimensions.

A primary object of the present invention is to provide an inexpensive, compact, lightweight, and reliable stand for removably interconnecting an intermediate portion of a horizontally disposed elongated member with the lower end of a vertically disposed elongated member. Another object of the present invention is to provide an inexpensive, lightweight, compact, and reliable stand for interconnecting the lower end of an umbrella post of an umbrella table with a board of a patio deck, such as to prevent unintentional displacement or toppling of the umbrella table in the event of a substantial gust of wind.

These, and many other objects, features, and advantages of the present invention will become apparent to those skilled in the art when the following detailed description is read in conjunction with the drawings appended hereto.

DETAILED DESCRIPTION OF THE PREFERRED EMBODIMENT

Figure 1:
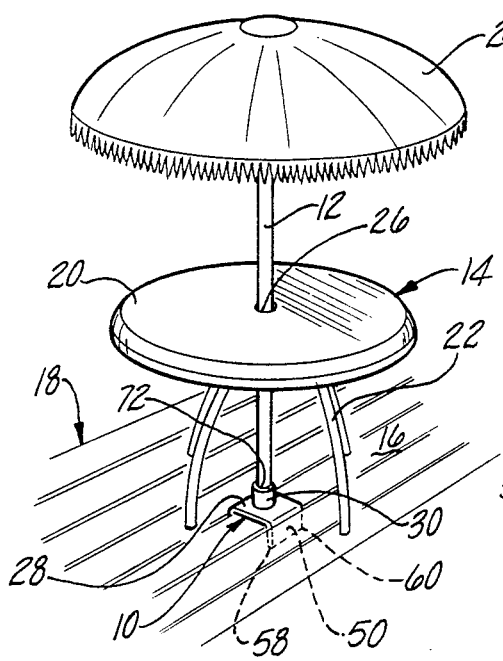
FIG. 1 is a partial perspective view of an umbrella stand according to the present invention, used in conjunction with an umbrella table disposed on a patio deck.

Referring now to the drawings, and more particularly to FIG. 1, an umbrella stand 10 according to the present invention for interconnecting the lower end of an umbrella post 12 of an umbrella table 14 with a board 16 of a patio deck 18 is illustrated. The umbrella table 14 has a circular table top 20 and a pedestal 22 for supporting the table top. A collapsible umbrella 24 is disposed above the circular table top 20. The collapsible umbrella 24 is mounted to the upper end of the umbrella post 12. The lower end of the umbrella post 12 extends downwardly from the collapsible umbrella 24 through an axially disposed aperture 26 in the circular table top 20, to a location adjacent the patio deck 18. The umbrella post 12 is typically circular in cross-section.

Figure 2:
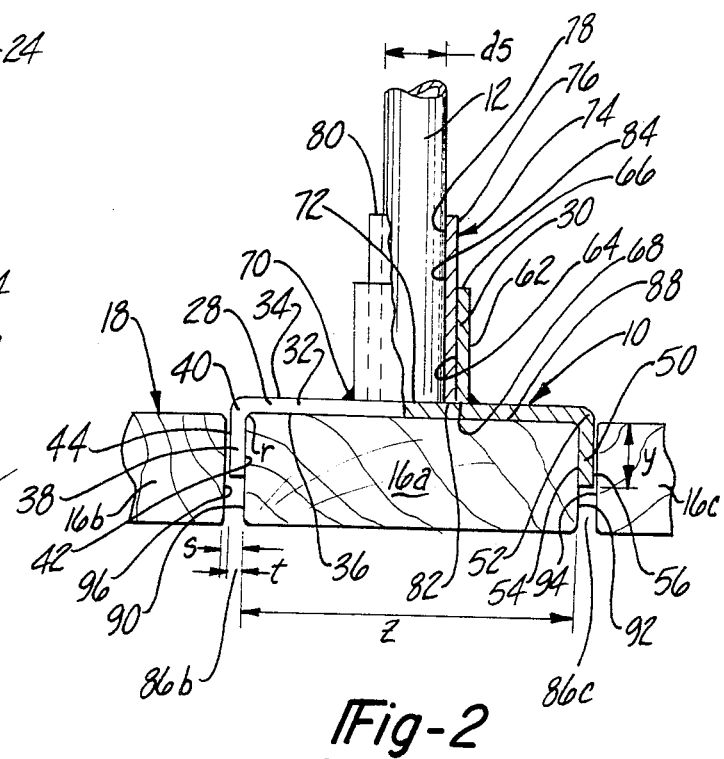
FIG. 2 is a partially cutaway front elevational view of the umbrella stand of FIG. 1, shown together with portions of the patio deck and the umbrella post of the umbrella table.
Figure 3:
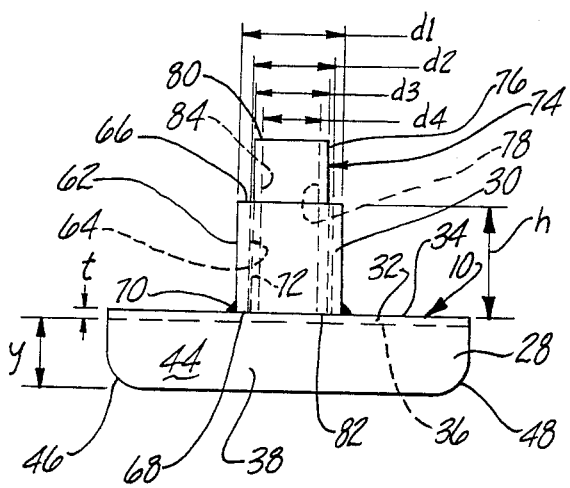
FIG. 3 is a side elevational view of the umbrella stand of FIG. 1.
Figure 4:
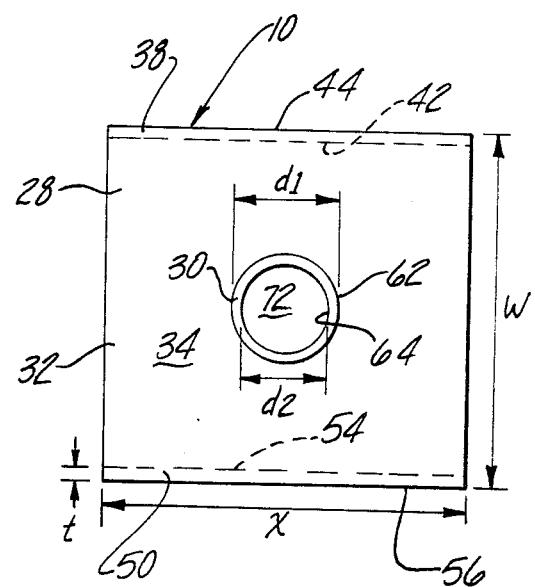
FIG. 4 is a plan view thereof.

Referring now to FIGS. 2 through 4, the umbrella stand 10 is illustrated in detail. The umbrella stand 10 may be a unitary member formed by a progressive stamping process, a forging process, a casting process, or a molding process. Alternatively, and as illustrated, the umbrella stand 10 may be constructed from a board engaging member 28 and an umbrella post engaging member 30 fixedly interconnected with each other.

In the preferred embodiment, the board engaging member 28 is a stamping formed from a piece of sheet metal having a thickness t. The board engaging member 28 has a base portion 32 having a flat upper surface 34 and a flat lower surface 36. The base portion 32 has a predetermined width w and a predetermined depth x, as shown in FIG. 4.

The board engaging member 28 further has a first flange 38 formed therefrom extending normally to the base portion 32 and in a downward direction therefrom. As shown in FIG. 2, the first flange 38 is formed in the board engaging member 28 by forming a bend 40 of a predetermined small radius r. The first flange 38 has a flat inner surface 42 and a flat outer surface 44. The first flange 38 is further provided with rounded corners 46 and 48 as best shown in FIG. 3.

A second flange 50 extends normally from the base portion 32 of the board engaging member 28 in the same direction as the first flange 38 by forming a bend 52 of the predetermined small radius r in the board engaging member 28 as shown in FIG. 2. The second flange 50 has a flat inner surface 54 and a flat outer surface 56, as well as rounded corners 58 and 60, shown only in FIG. 1.

Each of the first and second flanges 38 and 50 extend a predetermined distance below the flat lower surface 36 of the base portion 32 such as to define a flange height y.

In the preferred embodiment, the umbrella post engaging member 30 is a right circular cylindrical tubular member, for example, formed of a suitable metallic material. The umbrella post engaging member 30 has an outer cylindrical surface 62 having an outer diameter $d_1$ and an inner cylindrical surface 64 having an inner diameter $d_2$. The umbrella post engaging member 30 is further provided with an upper annular surface 66 and a lower annular surface 68, the lower annular surface 68 being interconnected, for example, by means of welds 70, to the flat upper surface 34 of the base portion 32 of the board engaging member 28. The umbrella post engaging member 30 cooperates with the flat upper surface 34 to form a first cylindrical socket 72.

An adapter 74, as best depicted in FIG. 3, is removably inserted in the first cylindrical socket 72. The adapter 74 is a right circular cylindrical tubular member having an outer cylindrical surface 76 with an outer diameter $d_3$ smaller than the inner diameter $d_2$ of the inner cylindrical surface 64 of the umbrella post engaging member 30. The adapter 74 is further provided with an inner cylindrical surface 78 having an inner diameter $d_4$, an upper annular surface 80, and a lower annular surface 82. The adapter 74 cooperates with the flat upper surface 34 of the base portion 32 of the board engaging member 28 to form a second cylindrical socket 84 of a reduced diameter, as compared with the first cylindrical socket 72.

The umbrella stand 10 of the present invention is removably interconnected with the board 16 of the patio deck 18, as shown in FIGS. 1 and 2, and as described below.

The patio deck 18, which is well known in the art, is constructed from a plurality of boards 16 arranged in a parallel spaced apart relationship such as to form a platform. In particular, as shown in FIG. 2, any preselected board 16a, except the boards at the extreme edges of the patio deck, is provided with a pair of adjacent boards 16b and 16c disposed on opposite sides thereof and extending parallel thereto. An elongated slot 86b and 86c is formed, respectively, between the adjacent boards 16b and 16c and the preselected board 16a, the slots having a predetermined width s. Each of the boards, 16a, 16b, and 16c are rectangular in cross-section and have a predetermined width z. Thus, the preselected board 16a has a flat top surface 88 and two flat side surfaces 90 and 92. Each of the adjacent boards 16b and 16c has a flat side surface 94 and 96, respectively, disposed adjacent the flat side surfaces 90 and 92 of the preselected board 16a.

The width w, the radius r, and the thickness t of the board engaging member 28 are preselected such as to permit removable and movable interconnection of the board engaging member 28 with the board 16a by insertion of the first and second flanges 38 and 50, respectively, in the elongated slots 86b and 86c, the flat lower surface 36 of the board engaging member resting against the flat top surface 88 of the board. The lower end of the umbrella post 12 is removably insertable in the first cylindrical socket 72, as shown in FIG. 1, or the second cylindrical socket 84, as shown in FIG. 1, depending on the outer diameter $d_5$ of the umbrella post.

The depth x of the base portion 32 of the board engaging member 28 is of a preselected dimension such as to resist unintentional rotational movement of the umbrella stand about an axis parallel with the patio deck 18 and normal to the longitudinal axis of the preselected board 16a.

The flange height y of the first and second flanges 38 and 50 is preselected, such as to be sufficient to inhibit unintentional rotation of the umbrella stand 10 about the longitudinal axis of the preselected board 16a. The first and second flanges 38 and 50 also prevent inadvertent motion of the umbrella stand 10 in any direction other than along the longitudinal axis of the preselected board 16a, while friction between the umbrella stand 10 and the preselected board 16a inhibit such longitudinal motion.

As an example, a typical patio deck 18 may be constructed of boards having a width z of 4 inches, and slots having a width s of 1 inch. An umbrella stand 10 for this patio deck may be provided having a width w of 5 and ¾ inches (5.75 in.), a depth X of 6 inches (6 in.), a flange height y of 1 inch (1 in.), and a socket height h of 2 inches (2 in.). Furthermore, most currently available umbrella posts 12 may be accommodated by the provision of a first cylindrical socket 72 having a diameter $d_2$ of 1 and ¾ inches (1.75 in.) and an adapter 74 forming a second cylindrical socket 84, having an inner diameter $d_4$ of 1½ inches (1.5 in.).

It will be appreciated by those skilled in the art that the above described umbrella stand 10 is less expensive, more compact, and lighter in weight than the sand filled conical bases typically used currently to maintain the stability of the umbrella table 14. Yet, the umbrella stand 10 will reliably maintain the umbrella table 14 in a fixed position relative to the patio deck 18. If desired, additional frictional resistance to the unintentional longitudinal motion of the umbrella stand 10 along the longitudinal axis of the preselected board 16a may be prevented by the provision of frictional material, or a rough surface treatment, not shown in the drawing, for the flat lower surface 36.

It will further be appreciated by those skilled in the art that the present invention provides an umbrella stand 10 which will reliably secure the lower end of an umbrella post 12 of an umbrella table 14 in a fixed position yet will facilitate intentional repositioning of the umbrella table 14.

The above detailed description constitutes the best mode contemplated by the inventor for carrying out the invention at the time of filing. However, the above detailed description is merely exemplary of the many variations and modifications which may be made to the present invention without departing from the spirit of the invention. These many variations and modifications are within the intended scope of the claims appended hereto.

What is claimed as novel is as follows:

1. In combination with an umbrella having an umbrella post, and an umbrella table having an aperture, said umbrella post extending through said aperture, a stand for removable interconnecting the lower end of said umbrella post of said umbrella table to a deck, said deck having a plurality of horizontally disposed elongated members, each having a rectangular cross-section, said plurality of horizontally disposed elongated members being disposed in a horizontal coplanar array such that said plurality of horizontally disposed elongated members are parallel to each other and spaced apart, said umbrella post further being a cylindrical member supported at a location remote from said lower end of said umbrella post by said umbrella table, said stand further comprising:

a main body having a flat base and a pair of spaced apart flanges extending normally therefrom in a first predetermined direction such that said main body is adapted to be removably interconnected with said deck by mounting said flat base to an upper surface of at least one of said horizontally disposed elongated members in an orientation such that said pair of spaced apart flanges extend between adjacent pairs of horizontally disposed elongated members; and cylindrical socket means extending from said flat base in a second predetermined direction opposite said first predetermined direction, said lower end of said umbrella post being removably received in said cylindrical socket means.

2. The combination of claim 1 wherein said cylindrical socket means comprises a cylindrical tubular member fixedly interconnected with said flat base portion.

3. The combination of claim 2 wherein said main body comprises a U-shaped stamping.

4. The combination of claim 1 further comprising a tubular adapter removably insertable in said cylindrical socket means to define a secondary socket means of reduced diameter for selectively interconnecting an alternate umbrella post of reduced diameter with said deck.

* * * * *